(12) United States Patent
Nerone et al.

(10) Patent No.: US 8,644,998 B2
(45) Date of Patent: *Feb. 4, 2014

(54) PRE-PROGRAMMED ENERGY MANAGEMENT BALLAST OR DRIVER

(75) Inventors: Louis Robert Nerone, Brecksville, OH (US); David Joseph Kachmarik, Strongsville, OH (US); Himamshu Prasad, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/034,375

(22) Filed: Feb. 24, 2011

(65) Prior Publication Data

US 2011/0144821 A1    Jun. 16, 2011

Related U.S. Application Data

(63) Continuation of application No. 12/561,645, filed on Sep. 17, 2009, now Pat. No. 7,908,037.

(60) Provisional application No. 61/164,171, filed on Mar. 27, 2009.

(51) Int. Cl.
*G06F 1/26* (2006.01)
*G06F 1/32* (2006.01)

(52) U.S. Cl.
USPC ............ 700/296; 700/295; 315/291; 315/312

(58) Field of Classification Search
USPC ............... 700/14, 16, 19, 275, 286, 295, 296, 700/297, 306; 315/291, 294, 312, 326, 360; 340/3.1, 7.38, 309.4, 309.16, 501; 307/31, 35, 38, 39, 116, 140, 141, 307/141.4

See application file for complete search history.

(56) References Cited

U.S. PATENT DOCUMENTS

| 4,398,131 | A |  | 8/1983 | Tarroux et al. |
|---|---|---|---|---|
| 5,030,890 | A |  | 7/1991 | Johnson |
| 5,254,908 | A |  | 10/1993 | Alt et al. |
| 5,668,446 | A | * | 9/1997 | Baker .......................... 315/294 |
| 5,850,127 | A | * | 12/1998 | Zhu et al. ..................... 315/307 |
| 5,962,989 | A | * | 10/1999 | Baker .......................... 315/294 |
| 6,466,826 | B1 | * | 10/2002 | Nishihira et al. ............... 700/17 |

(Continued)

FOREIGN PATENT DOCUMENTS

| DE | 29802476 | 8/1998 |
|---|---|---|
| DE | 10006138 | 8/2001 |

(Continued)

OTHER PUBLICATIONS

International Search Report issued in connection with corresponding PCT Application No. PCT/US2010/023553 on May 6, 2010.

*Primary Examiner* — Charles Kasenge
(74) *Attorney, Agent, or Firm* — Fay Sharpe LLP

(57) ABSTRACT

A pre-programmed energy saving ballast or driver is presented, having a pre-defined energy profile to which the output power is controlled in accordance with the current time ascertained from the input power connection via simplex clock information or from received broadcast time signals, and which allows a user to select from a number of pre-programmed profiles and/or to modify and store user-defined energy profiles.

20 Claims, 4 Drawing Sheets

(56) References Cited

U.S. PATENT DOCUMENTS

| | | |
|---|---|---|
| 6,489,729 B1 * | 12/2002 | Erhardt et al. ............ 315/209 R |
| 6,658,303 B2 | 12/2003 | Hatemata et al. |
| 6,798,341 B1 | 9/2004 | Eckel et al. |
| 6,842,668 B2 | 1/2005 | Carson et al. |
| 6,947,024 B2 * | 9/2005 | Lee et al. ...................... 315/291 |
| 7,180,252 B2 | 2/2007 | Lys et al. |
| 7,233,115 B2 * | 6/2007 | Lys ................................ 315/291 |
| 7,242,152 B2 | 7/2007 | Dowling et al. |
| 7,317,976 B2 * | 1/2008 | Heimberger et al. ........... 701/36 |
| 7,353,071 B2 * | 4/2008 | Blackwell et al. .............. 700/23 |
| 7,495,397 B2 * | 2/2009 | Okabe ........................ 315/169.1 |
| 7,734,356 B2 * | 6/2010 | Cleland et al. .................. 700/12 |
| 7,908,037 B2 * | 3/2011 | Nerone et al. ................. 700/296 |
| 7,965,050 B2 * | 6/2011 | Nieuwlands ................... 315/312 |
| 8,013,535 B2 * | 9/2011 | Jozwik ...................... 315/200 A |
| 8,049,599 B2 * | 11/2011 | Sutardja ..................... 340/12.33 |
| 2002/0195974 A1 * | 12/2002 | Erhardt et al. ................. 315/291 |
| 2004/0155756 A1 | 8/2004 | Liu et al. |
| 2005/0057188 A1 * | 3/2005 | Wong et al. .................... 315/291 |
| 2005/0231133 A1 * | 10/2005 | Lys ................................ 315/291 |
| 2007/0007898 A1 | 1/2007 | Bruning |
| 2007/0273307 A1 | 11/2007 | Westrick et al. |
| 2008/0157939 A1 * | 7/2008 | Sutardja ................... 340/310.12 |
| 2008/0246417 A1 | 10/2008 | Numeroli et al. |
| 2009/0045754 A1 * | 2/2009 | Jozwik ...................... 315/200 A |
| 2009/0248217 A1 * | 10/2009 | Verfuerth et al. ............. 700/295 |
| 2009/0326730 A1 * | 12/2009 | Bjeljac et al. ................. 700/296 |

FOREIGN PATENT DOCUMENTS

| | | |
|---|---|---|
| WO | WO 2006126240 | 11/2006 |
| WO | WO 2007003038 | 1/2007 |
| WO | WO 2007008283 | 1/2007 |
| WO | WO 2009003522 | 1/2009 |
| WO | WO 2009018853 | 2/2009 |

* cited by examiner

PRE-PROGRAMMED ENERGY MANAGEMENT BALLAST OR DRIVER

REFERENCE TO RELATED APPLICATIONS

This application is a continuation of, and claims priority to and the benefit of, U.S. patent application Ser. No. 12/561,645, filed on Sep. 17, 2009 now U.S. Pat. No. 7,908,037, entitled PRE-PROGRAMMED ENERGY MANAGEMENT BALLAST OR DRIVER, which claims priority to and the benefit of U.S. Provisional Patent Application Ser. No. 61/164,171, filed Mar. 27, 2009, entitled PRE-PROGRAMMED ENERGY MANAGEMENT BALLAST OR DRIVER, the entirety of which applications are hereby incorporated by reference.

BACKGROUND OF THE DISCLOSURE

Ballasts and driver devices are used for providing power to light sources such as fluorescent lamps, LED arrays and the like. Conventional design goals for these devices include continuing efforts to increase efficiency. Ballast and discharge lamp technologies, however, are generally reaching practical efficiency limits. End users are therefore searching for other solutions to further the goal of total energy savings. Various approaches proposed in the past include control and sensor systems to implement power-down strategies to save energy by turning off or dimming the lights either when someone has either forgotten to turn them off or it is expected the site will not be used or occupied. However, these solutions require additional sensors, controllers, complex wiring and other peripheral devices, and are thus cost prohibitive as well as difficult to install, maintain and operate. A need therefore remains for improved ballasts and drivers for light sources and techniques which may successfully achieve end user energy savings without significantly increasing operating costs and complexity.

SUMMARY OF THE DISCLOSURE

A pre-programmed energy saving lighting system is provided, including a power circuit to control the power provided from an input power source to a light source, such as AC power for fluorescent lamps or DC power for LED arrays, etc. The system further includes a profile control component that signals the power circuit to control the light source power according to a pre-programmed energy profile as a function of a current time value. The system in certain embodiments includes an internal clock component that provides the current time value to the control component to start the pre-programmed energy profile. A sync input is provided in some embodiments to start or program the internal clock according to a signal from the power circuit when power is applied to the lighting system. The sync input may also synchronize the internal clock according to a current time signal from a receiver that receives a broadcast current time signal, such as an atomic clock signal receiver, or the sync input in some embodiments receives the current time signal from the input power source as simplex clock information. The system includes a bypass component in certain embodiments to sense input power conditions and to selectively inhibit profile control if a pre-defined sequence of input power conditions occurs within a predetermined time period. In some embodiments, the system stores pre-programmed energy profiles including a default energy profile and one or more secondary profiles, and the bypass component selects one of the secondary profiles if a certain pre-defined sequence of power conditions is sensed. The system may also store one or more user-defined energy profiles that can be created and/or modified by the bypass component based on a pre-defined sequence of power conditions sensed at the input power. In this manner, an end user can reprogram the system for a desired profile control using a power switch. In certain embodiments, moreover, the system may also include a communications interface allowing profile selection or modification to reprogram the system by RF or other communications.

A method is also provided for operating a lighting system. The method includes storing a pre-programmed energy profile in a lighting system, providing electrical power from an input power source to a light source, and controlling the provision of electrical power from the input power source to the light source according to the pre-programmed energy profile as a function of a current time value. Some embodiments of the method include receiving the current time value from a broadcast current time signal or as simplex clock information from the input power source. Further embodiments may also include storing a plurality of pre-programmed energy profiles including a default energy profile and one or more secondary profiles in the system, and selecting one of the secondary profiles based at least partially on a pre-defined sequence of power conditions. Still other embodiments may include creating or modifying at least one user-defined energy profile based at least partially on a pre-defined sequence of power conditions.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
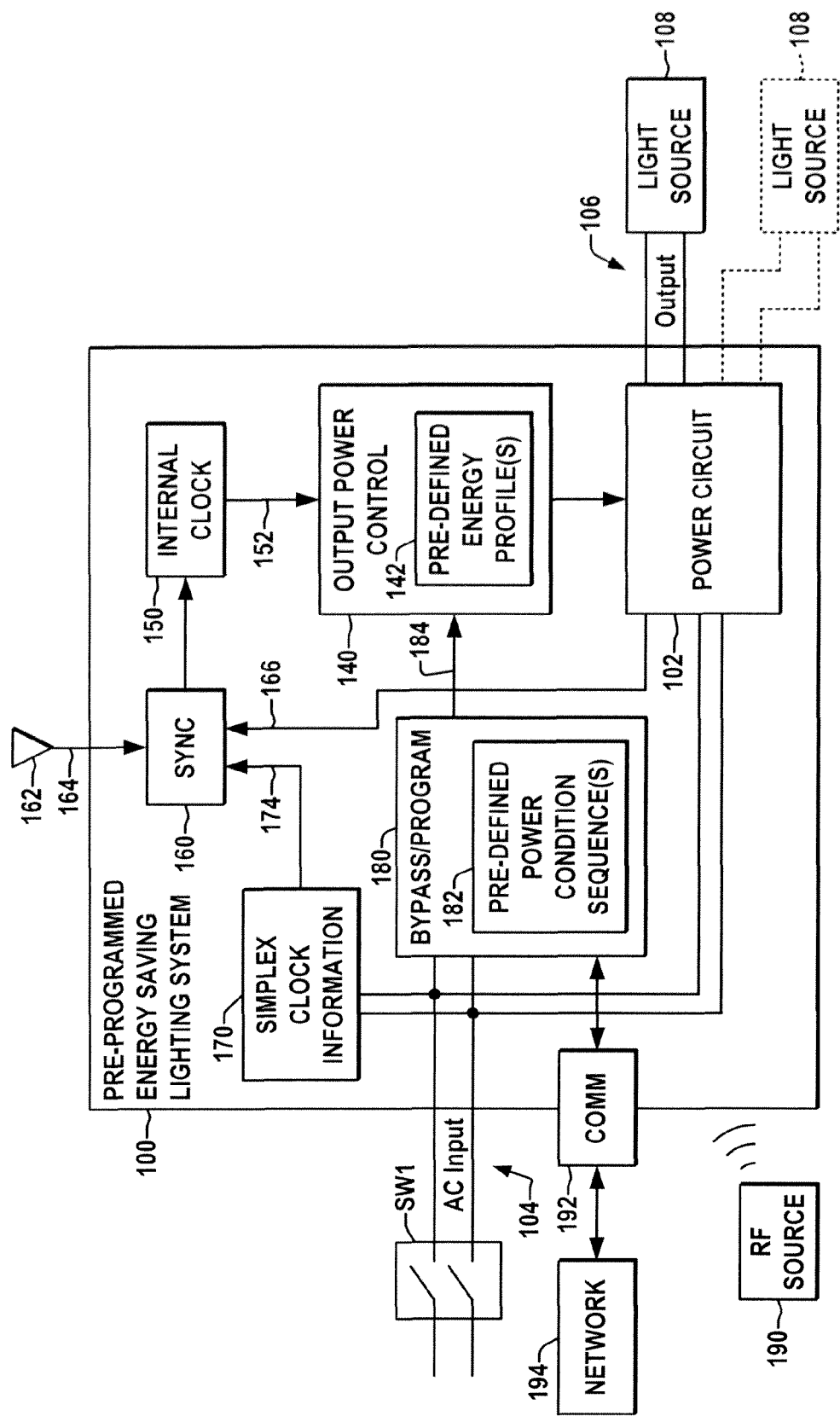
FIG. 1 is a schematic diagram illustrating an exemplary pre-programmed energy saving lighting system with a power circuit and a profile control component.

Referring now to the drawings, where like reference numerals are used to refer to like elements throughout, and wherein the various features are not necessarily drawn to scale, FIG. 1 illustrates a pre-programmed energy saving lighting system 100 that includes a power circuit 102 receiving single or multi-phase AC input power from an input 104 and which provides electrical power at an output 106 to a light source 108. The power circuit 102 can be any suitable electrical circuitry to selectively convert the power from the input 104 to a form suitable for driving the light source load 108 at the output 106, and may in some embodiments include isolation components and the like. As described further below in connection with FIGS. 2 and 3, for example, the exemplary power circuit 102 includes an input rectifier 110 followed by a DC-DC converter 120, which may provide DC output power to LED array-type light source loads 108 (FIG. 3) or the DC-DC converter 120 in another embodiment drives an inverter 130 (FIG. 2) to provide AC output power to one or more lamps 108. The presently disclosed embodiments may be employed in a variety of electronic lighting applications to implement a pre-programmed energy management ballast or driver for powering fluorescent lamps or LED arrays and will be described with particular reference thereto. It is to be appreciated that the present ballast can also be used in other lighting applications, and is not limited to the aforementioned application.

The system 100 also includes an output control component 140 that is pre-programmed with one or more pre-defined energy profiles 142. As further shown in the embodiment of FIG. 4, the control component 140 in some embodiments stores a pre-defined default energy profile 142a and one or more pre-defined secondary profiles 142b, and an end user may select among the stored profiles 142 by selectively switching the input power using a switch SW1 (FIG. 1)) or other programming means. The profiles 142 in one example can be files or sets of values or equations that can be stored and which define output power levels as a function of current time. The control component 140 can be any suitable hardware, software, programmable logic, memory, or combinations thereof to control the output power provided to the light source(s) 108 by the power circuit 102 in accordance with a selected profile 142, 144 as described herein and to implement the user programmability functions and communications functions described herein.

As best shown in FIG. 1, the control component 140 signals the power circuit 102 to control the provision of electrical power from the input power source 104 to the light source 108 according to a selected pre-programmed energy profile 142 as a function of a current time value 152 received from an internal clock 150. The clock component 150 can be any circuit or device that maintains a current time value that can be updated as needed and which provides the current time value as an output signal or value in the form of a message. In operation, the internal clock component 150 provides the current time value 152 in the form of a signal or message to the energy profile control component 140 to start the pre-programmed energy profile 142, and from this the control 140 determines the current desired output level and controls the power circuit 102 accordingly.

A sync input 160 is provided in the system 100 to start and/or program the internal clock component 150. The sync input 160 in one embodiment is operative according to a signal 166 from the power circuit 102 to start the internal clock component when power is applied to the lighting system 100 and operates according to a current time signal 164, 174 to synchronize the internal clock component 150 with a current time. In the illustrated system 100, this can be from one of two different sources. A receiver 162 is operatively coupled to the sync input 160 in one embodiment to receive a broadcast current time signal 164, where the sync input 160 is operative to synchronize the internal clock component 150 with a current time according to the received current time signal 164. The sync input 160 in one embodiment also receives the current time signal 174 from the power input 104 as simplex clock information 170, and synchronizes the internal clock component 150 with the current time according to the received simplex clock information 170.

The lighting system 100 in one embodiment also includes a bypass component 180 operatively coupled with the input power source 104 to sense input power conditions. The bypass component 180 in certain implementations stores one or more pre-defined sequences of input power conditions 182 and selectively inhibits profile control via a command signal or message 184 based at least partially on a pre-defined sequence of input power conditions 182 within a predetermined time period. In this manner, the end user may actuate the power switch SW1 according to a pre-defined sequence 182 to toggle the system 100 in and out of profile control mode.

Moreover, for embodiments where the system 100 stores one or more pre-programmed energy profiles 142 (e.g., a default energy profile 142a and secondary profiles 142b), the bypass component 180 is operative to select one of the secondary profiles 142b based at least partially on a pre-defined sequence of power conditions 182. In this manner, the user can operate the switch SW1 to select from among the pre-defined energy profiles 142 to better accommodate a particular user situation.

Figure 4:
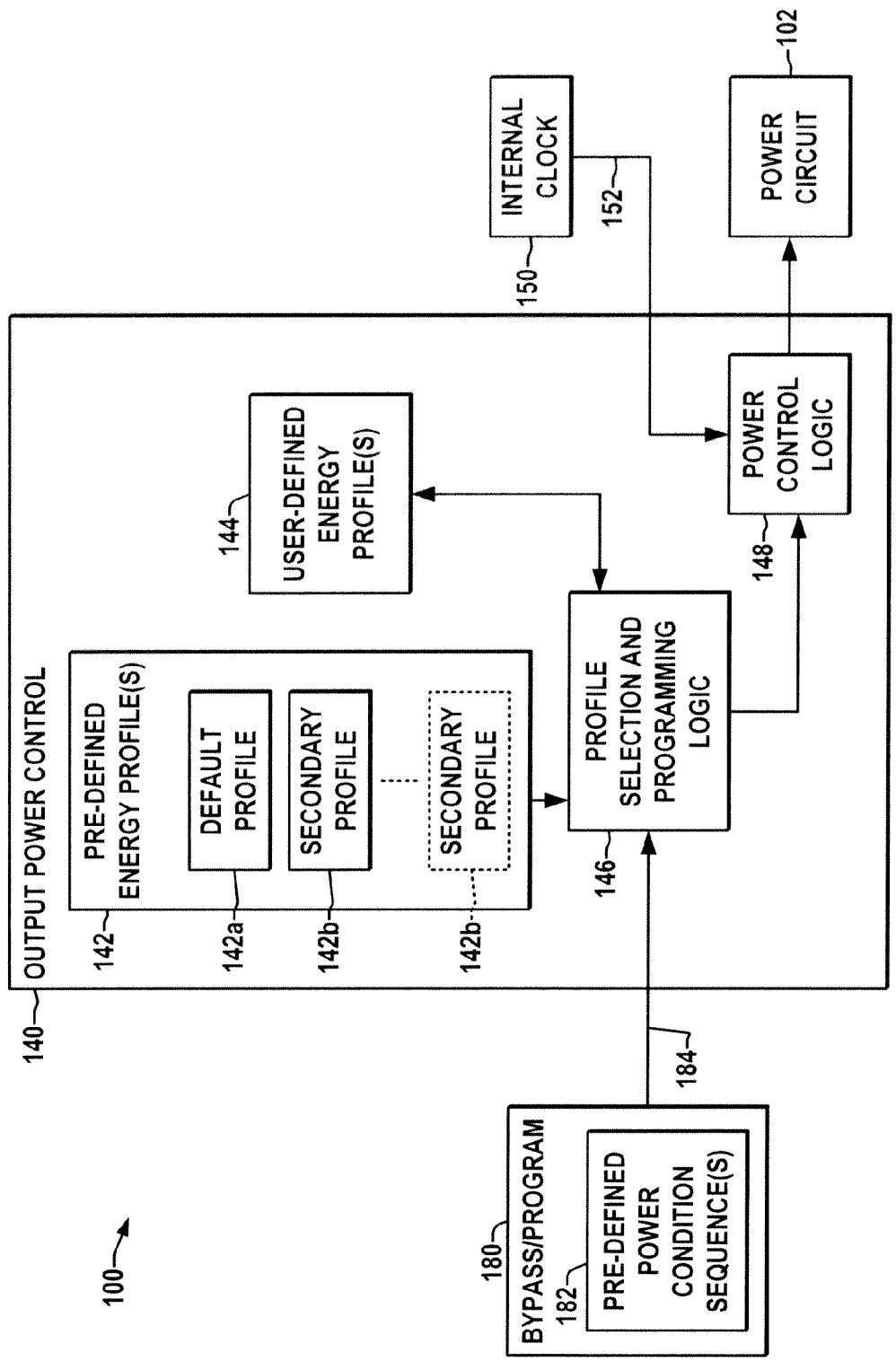
FIG. 4 is a schematic diagram illustrating further details of the profile control component in the system of FIG. 1.

As further shown in FIG. 4, the lighting system 100 may also store one or more user-defined energy profiles 144, such as in the control component 140 in one embodiment. The bypass component 180 in this case is operative to create or modify the at least one user-defined energy profile 144 based at least partially on a pre-defined sequence of power conditions 182. By this operation, the end user can actuate a pre-defined sequence of switching operations using switch SW1 in a pre-determined time period and thus create new profiles 144 or modify existing profiles 142, 144 for storage in the system 100 and which can then be selected for profile-control type operation of the light source 108 as desired in a given installation situation.

The exemplary lighting system 100 may also include a communications interface or port 192 that may be connected to an external device directly or via a network 194 to receive electronic (wired and/or wireless) communications messages via any suitable protocol by which a user can perform profile selection and/or profile modification to reprogram the system 100. In this regard, the interface 192 may be operable to receive wireless communications from (and send wireless messages to) an RF source 190 for one or more of these operations.

Figure 2:
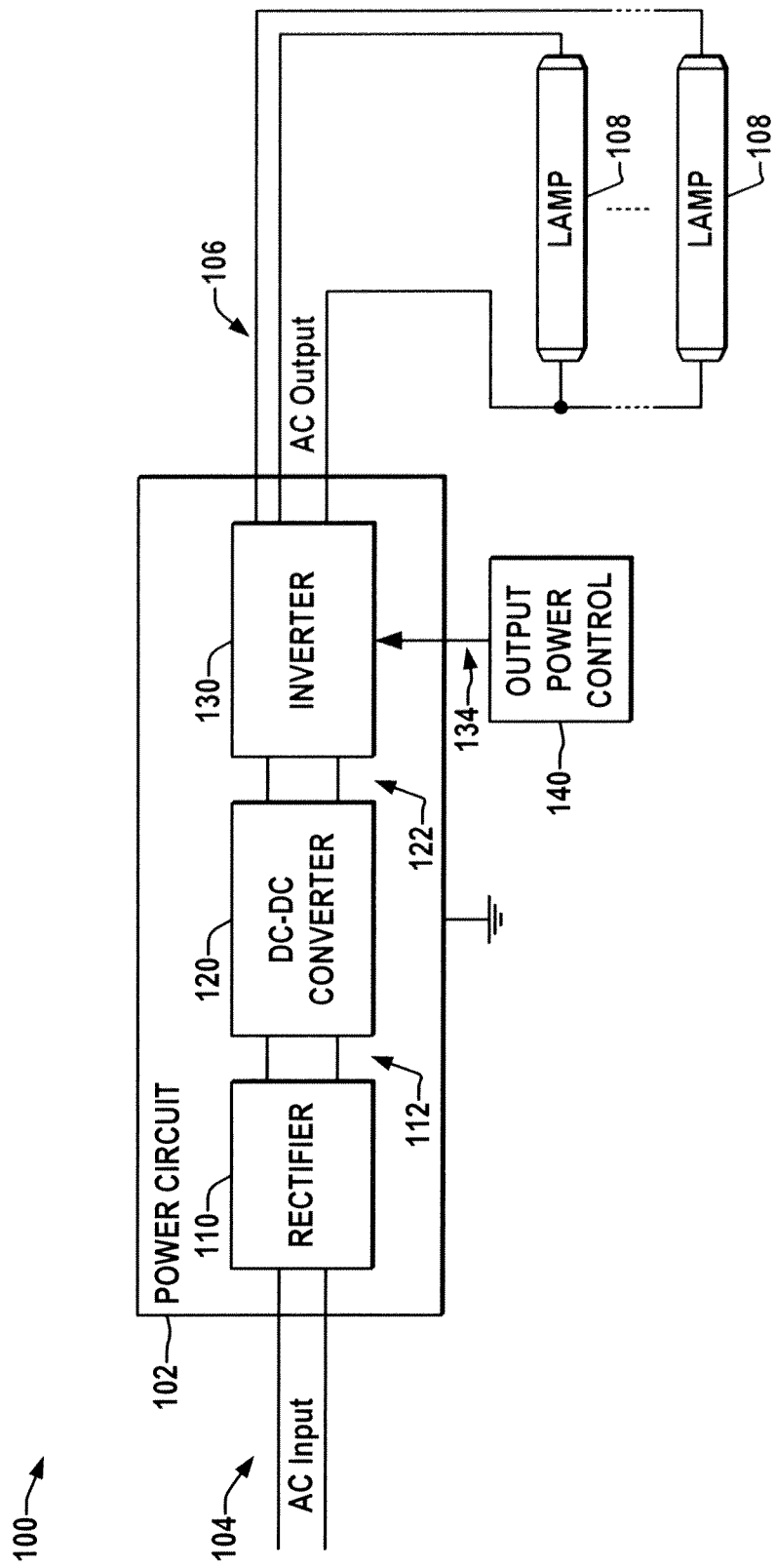
FIG. 2 is a schematic diagram illustrating an exemplary power circuit embodiment with an inverter to provide AC output power to one or more fluorescent lamp light sources in the system of FIG. 1.

Referring also to FIG. 2, the power circuit 102 in one embodiment is a ballast with an output 106 for providing AC output power to operate one or more lamps 108. The ballast 102 includes a rectifier 110 that receives and rectifies single or multi-phase AC power from the input 104, where any form of active or passive, full or half-wave rectifier 110 may be employed, such as a full bridge rectifier having four diodes (not shown) in one embodiment. The rectifier 110 has an output 112 providing a rectified DC voltage to a passive or switching type DC-DC converter 120 to convert the rectified DC voltage into a converter DC output voltage at a converter output 122. In some embodiments, the DC-DC converter 120 may also include power factor correction capabilities to control the power factor of the power circuit 102 and the system 100 generally. An inverter 130 is operatively coupled to the converter output 122 and converts the converter DC output voltage to provide an AC output voltage to drive the lamp(s) 108 at an inverter AC output 106, where the inverter 130 may be any suitable DC to AC converter, such as including switching devices operated according to inverter control signals 134 from the control component 140, and which may optionally include a transformer or other isolation components (not shown) to isolate the AC output from the input power.

Figure 3:
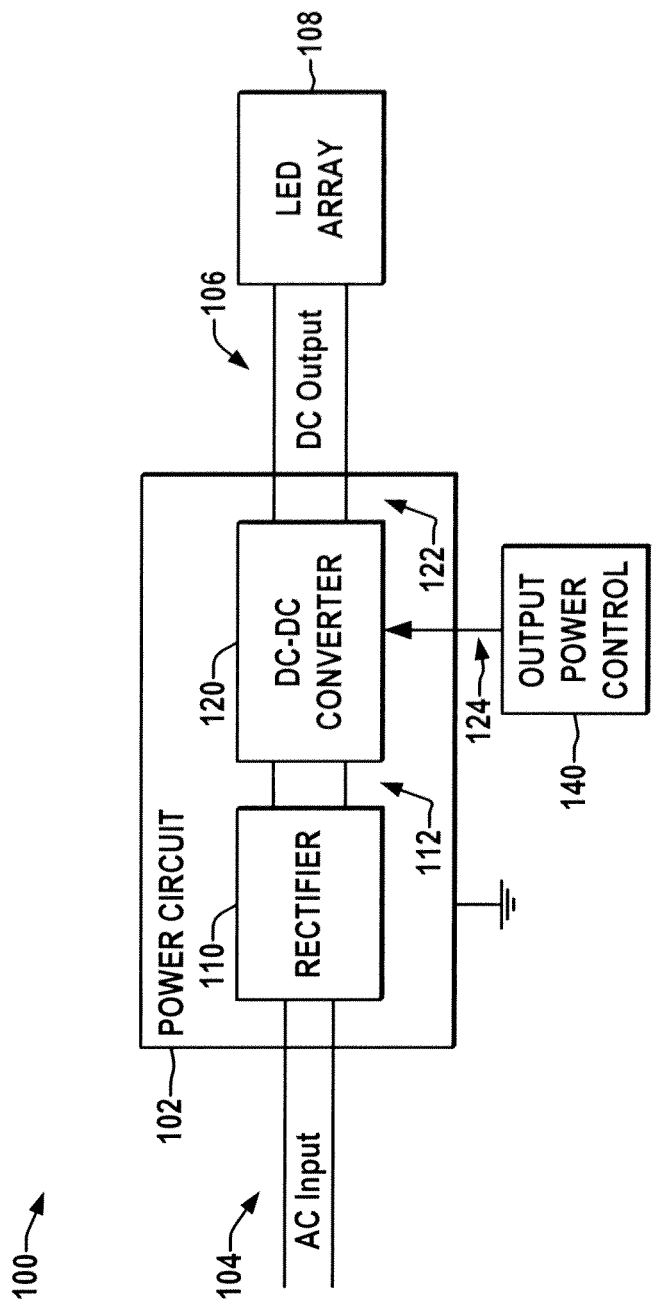
FIG. 3 is a schematic diagram illustrating another power circuit embodiment with a DC-DC converter to provide DC output power to an LED array light source in the system of FIG. 1.

FIG. 3 illustrates another embodiment of the system 100 in which the power circuit 102 is a driver for powering an LED array 108 with DC output power. In this embodiment, the rectified DC 112 is provided to a DC-DC converter 120, which is a switching type (e.g., boost, buck, etc.) converter operated according to switching control signals 124 from the control component 140. In operation, the DC-DC converter 120 converts the rectified DC voltage from the rectifier 110 into a converter DC output voltage at a converter output 122, and may also perform power factor correction to control the power factor of the power circuit 102. The output 122 of the DC-DC converter 120 is provided as a DC output 106 to drive the LED array load 108 under control of the output power control component 140.

The disclosure thus provides solutions for reducing energy consumption at a site by using a pre-programmed energy saving ballast or driver that follows a pre-determined profile based on time of day and can either turn itself off or reduce the light output at various times of the day. This system moreover, does not require any external control and in certain embodiments will self commission itself by either by synchronizing to a simplex or broadcast atomic clock signal. In this manner, once the unit is powered up it will begin to follow its pre-programmed profile, with end users being provided with means to select a different pre-determined profile and/or to create their own custom profiles using simple power switching operations or by external programming devices. In one implementation, a pre-defined default profile is pre-programmed into the system, which will be implemented until reprogrammed by the user.

In one embodiment depicted in FIG. 4, the output power control component 140 includes profile selection and programming logic 146 that is operable via the bypass/program component 180 by which a user can reprogram the profile 142, 144 by selecting from a number of pre-defined profiles 142 stored in the system 100, by performing power switching sequences of the power switch SW1 (FIG. 1) according to a pre-defined coding scheme. For example, an on-off-on sequence 182 within a given pre-defined time period may disable the energy profile control altogether (e.g., until a subsequent power down and reapplication of power), with other sequences 182 defining entry into/exit from a reprogramming mode, and when in reprogramming mode, further pre-defined input power sequences (within a pre-defined time period) will set the system to control the light power application according to one or more pre-defined secondary profiles 142b stored in the system 100. In other possible implementations, different profile selection and/or mode control functions can be actuated by controlling the time that power is applied/removed according to pre-defined sequences 182. For instance, the transition to and from programming mode may be accomplished by applying power and removing power for certain time periods (e.g., power off for 2 seconds, followed by power on for two seconds, followed by power off for 2 seconds, and then followed by power on for two seconds). Other such temporally exclusive switching sequences may then be used for selection between different preprogrammed energy control profiles, and/or for modifying or creating user-defined profiles 144. In certain embodiments, moreover, a timer or line cycle counter may be employed that is started once power is applied to the system 100 in order to control the output power according to a pre-determined profile 142, 144 once the timer or line cycle counter is started.

In another embodiment, at least one of the pre-programmed energy profiles 142 is a fixed energy profile. For example, a fixed energy profile can be associated with a specific ballast factor (BF), such as 0.87 in one embodiment. In related embodiments, moreover, a user can modify the fixed energy profile 142 in whole or in part on a predefined sequence of power conditions 182 (e.g., via the bypass/program component 180). These embodiments allow the user to tune the light output by selecting the ballast factor, where the user can program by selection.

The disclosed embodiments thus address the shortcomings of conventional systems by giving the end user a simple energy saving ballast or driver that will follow a time based profile, and that can be installed in a similar manor with existing ballasts and requires no external devices or controllers. Prior attempts to solve this problem have all resulted in complex systems that require user interface means, whereas the presently disclosed systems 100 do not require any user interface, although they are compatible with these types of systems.

Methods are also provided for operating a lighting system, such as the above described systems 100. The method comprises storing a pre-programmed energy profile 142 in a lighting system 100, providing electrical power from an input power source 104 to a light source 108, and controlling the provision of electrical power from the input power source 104 to the light source 108 according to the pre-programmed energy profile 142 as a function of a current time value 152. In certain embodiments, the method also includes receiving the current time value 152 from a broadcast current time signal 164, and may further include receiving the current time value 152 as simplex clock information 170 from the input power source 104. Further embodiments of the method may also include storing a plurality of pre-programmed energy profiles 142 including a default energy profile 142a and one or more secondary profiles 142b in the system 100, and selecting one of the secondary profiles 142b based at least partially on a pre-defined sequence of power conditions 182. In addition, the method may also provide for creating or modifying at least one user-defined energy profile 144 based at least partially on a pre-defined sequence of power conditions 182.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. A pre-programmed energy management ballast or driver, comprising:
   a power circuit operative to selectively convert power from an AC input into a form suitable for driving a light source;

a profile control component pre-programmed to control the provision by the power circuit of electrical power to the light source according to a pre-programmed energy profile as a function of a current time value;
a bypass component operatively coupled to the AC input to sense a predefined on/off pattern in application and removal of AC input power at the AC input, the bypass component providing a signal or message to the profile control component to selectively affect profile control of the provision of electrical power to the light source based on the on/off pattern;
an internal clock component operative to provide the current time value to the profile control component; and
a sync input operative to start or program the internal clock component, where the sync input is operative to receive a current time signal from the AC input as simplex clock information, and to synchronize the internal clock component with a current time according to the received simplex clock information.

2. The pre-programmed energy management ballast or driver of claim 1, where the profile control component begins to follow the pre-programmed energy profile once the ballast or driver is powered up without any external control.

3. The pre-programmed energy management ballast or driver of claim 1, where the bypass component is operative to provide the signal or message to the profile control component to selectively modify the pre-programmed energy profile based at least partially on the on/off pattern.

4. The pre-programmed energy management ballast or driver of claim 1, comprising a memory storing a plurality of pre-programmed energy profiles including a default energy profile and one or more secondary profiles, where the bypass component is operative to provide the signal or message to the profile control component to select one of the secondary profiles based at least partially on the on/off pattern.

5. The pre-programmed energy management ballast or driver of claim 4, where the bypass component is operative to provide the signal or message to the profile control component to selectively inhibit profile control based at least partially on the on/off pattern.

6. The pre-programmed energy management ballast or driver of claim 1, where the bypass component is operative to provide the signal or message to the profile control component to selectively inhibit profile control based at least partially on the on/off pattern.

7. The pre-programmed energy management ballast or driver of claim 1, where the power circuit comprises:
an input rectifier receiving AC input power from the AC input and providing a first DC output; and
a DC-DC converter operative to convert the first DC output into a second DC output suitable for driving at least one light emitting diode (LED) light source;
where the profile control component is operatively coupled with the DC-DC converter to control the provision of DC electrical power to the light source.

8. The pre-programmed energy management ballast or driver of claim 1, where the power circuit comprises:
an input rectifier receiving AC input power from the AC input and providing a first DC output; and
a DC-DC converter operative to convert the first DC output into a second DC output; and
an inverter operatively coupled with the DC-DC converter to convert the second DC output to provide an AC output signal suitable for driving at least one light source;
where the profile control component is operatively coupled with the inverter to control the provision of AC electrical power to the at least one light source.

9. The pre-programmed energy management ballast or driver of claim 1, where the power circuit, the profile control component, and the bypass component are located in a single housing.

10. A pre-programmed energy management ballast or driver, comprising:
a power circuit operative to selectively convert power from an AC input into a form suitable for driving a light source;
a profile control component pre-programmed to control the provision by the power circuit of electrical power to the light source according to a pre-programmed energy profile as a function of a current time value;
a bypass component operatively coupled to the AC input to sense a predefined on/off pattern in application and removal of AC input power at the AC input, the bypass component providing a signal or message to the profile control component to selectively affect profile control of the provision of electrical power to the light source based on the on/off pattern; and
a memory storing a plurality of pre-programmed energy profiles including a default energy profile and one or more secondary profiles;
where the bypass component is operative to provide the signal or message to the profile control component to select one of the secondary profiles based at least partially on the on/off pattern; and
where the bypass component is operative to provide the signal or message to the profile control component to selectively modify one or more of the secondary profiles based at least partially on the on/off pattern.

11. The pre-programmed energy management ballast or driver of claim 10, where the bypass component is operative to provide the signal or message to the profile control component to selectively inhibit profile control based at least partially on the on/off pattern.

12. The pre-programmed energy management ballast or driver of claim 11, comprising:
an internal clock component operative to provide the current time value to the profile control component; and
a sync input operative to start or program the internal clock component, where the sync input is operative to receive a current time signal from the AC input as simplex clock information, and to synchronize the internal clock component with a current time according to the received simplex clock information.

13. The pre-programmed energy management ballast or driver of claim 10, comprising:
an internal clock component operative to provide the current time value to the profile control component; and
a sync input operative to start or program the internal clock component, where the sync input is operative to receive a current time signal from the AC input as simplex clock information, and to synchronize the internal clock component with a current time according to the received simplex clock information.

14. The pre-programmed energy management ballast or driver of claim 10, where the power circuit comprises:
an input rectifier receiving AC input power from the AC input and providing a first DC output; and
a DC-DC converter operative to convert the first DC output into a second DC output suitable for driving at least one light emitting diode (LED) light source;
where the profile control component is operatively coupled with the DC-DC converter to control the provision of DC electrical power to the light source.

15. The pre-programmed energy management ballast or driver of claim 10, where the power circuit comprises:
 an input rectifier receiving AC input power from the AC input and providing a first DC output; and
 a DC-DC converter operative to convert the first DC output into a second DC output; and
 an inverter operatively coupled with the DC-DC converter to convert the second DC output to provide an AC output signal suitable for driving at least one light source;
 where the profile control component is operatively coupled with the inverter to control the provision of AC electrical power to the at least one light source.

16. The pre-programmed energy management ballast or driver of claim 10, where the power circuit, the profile control component, and the bypass component are located in a single housing.

17. A method of operating a lighting system, the method comprising:
 converting electrical power from an input power source to provide an output signal suitable for driving at least one light source;
 controlling the provision of electrical power to the at least one light source at least partially according to a pre-programmed energy profile as a function of a current time value;
 sensing a predefined on/off pattern in application and removal of power from the input power source;
 selectively modifying profile control in response to sensing the predefined on/off pattern;
 storing a plurality of pre-programmed energy profiles including a default energy profile and one or more secondary profiles; and
 selectively modifying one or more of the secondary profiles based at least partially on the on/off pattern.

18. The method of claim 17, further comprising selectively inhibiting profile control based on the on/off pattern.

19. The method of claim 17, further comprising:
 storing at least one user-defined energy profile; and
 selectively creating or modifying the at least one user-defined energy profile based at least partially on the on/off pattern.

20. The method of claim 17, further comprising:
 receiving a current time signal from an AC input as simplex clock information; and
 synchronizing an internal clock component with the current time value according to the received simplex clock information.

\* \* \* \* \*